Dec. 18, 1951 W. E. RANEY 2,578,837
VARIABLE-SPEED DRIVE
Filed April 19, 1949 2 SHEETS—SHEET 1
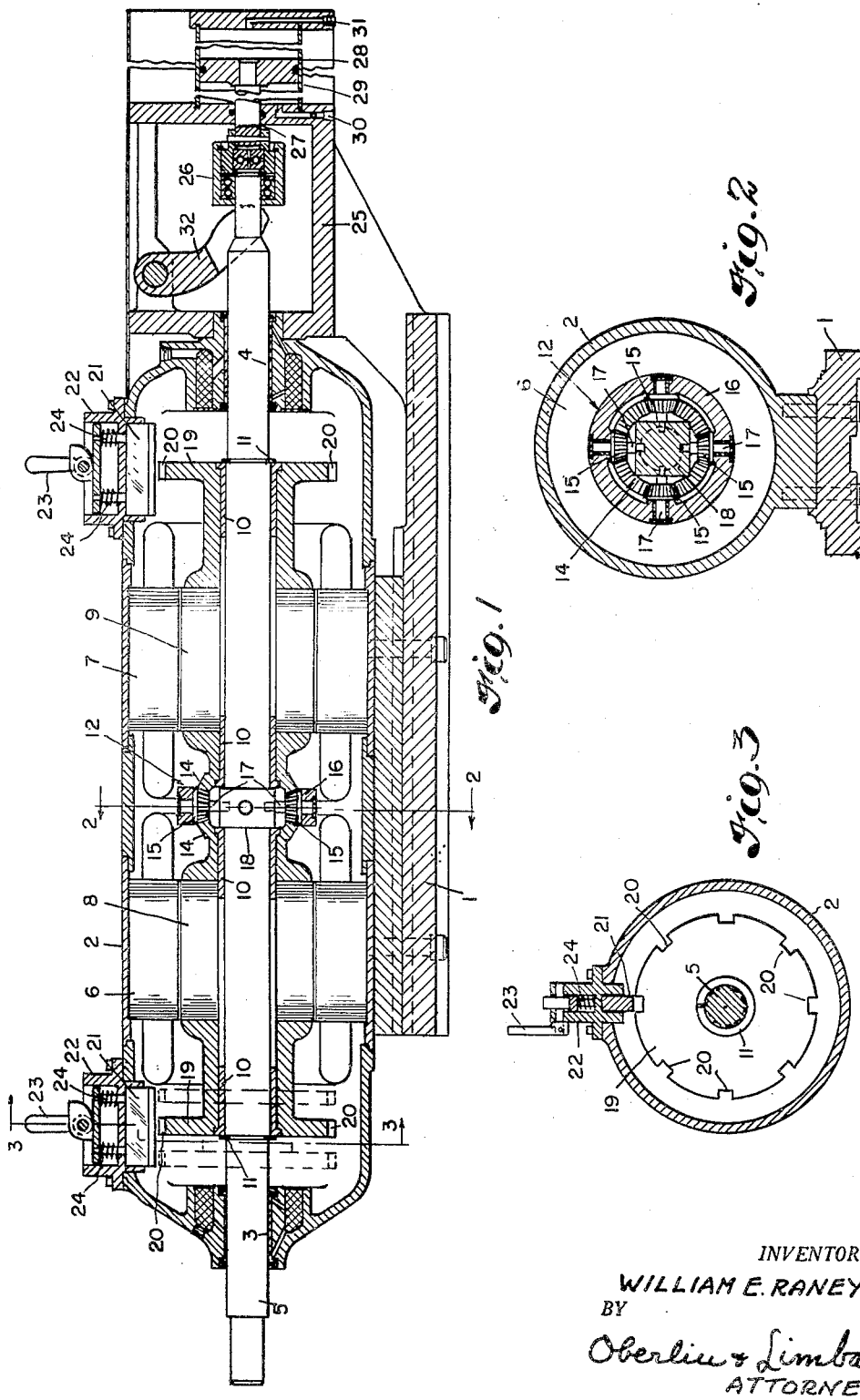
INVENTOR.
WILLIAM E. RANEY
BY
Oberlin & Limbach
ATTORNEYS.

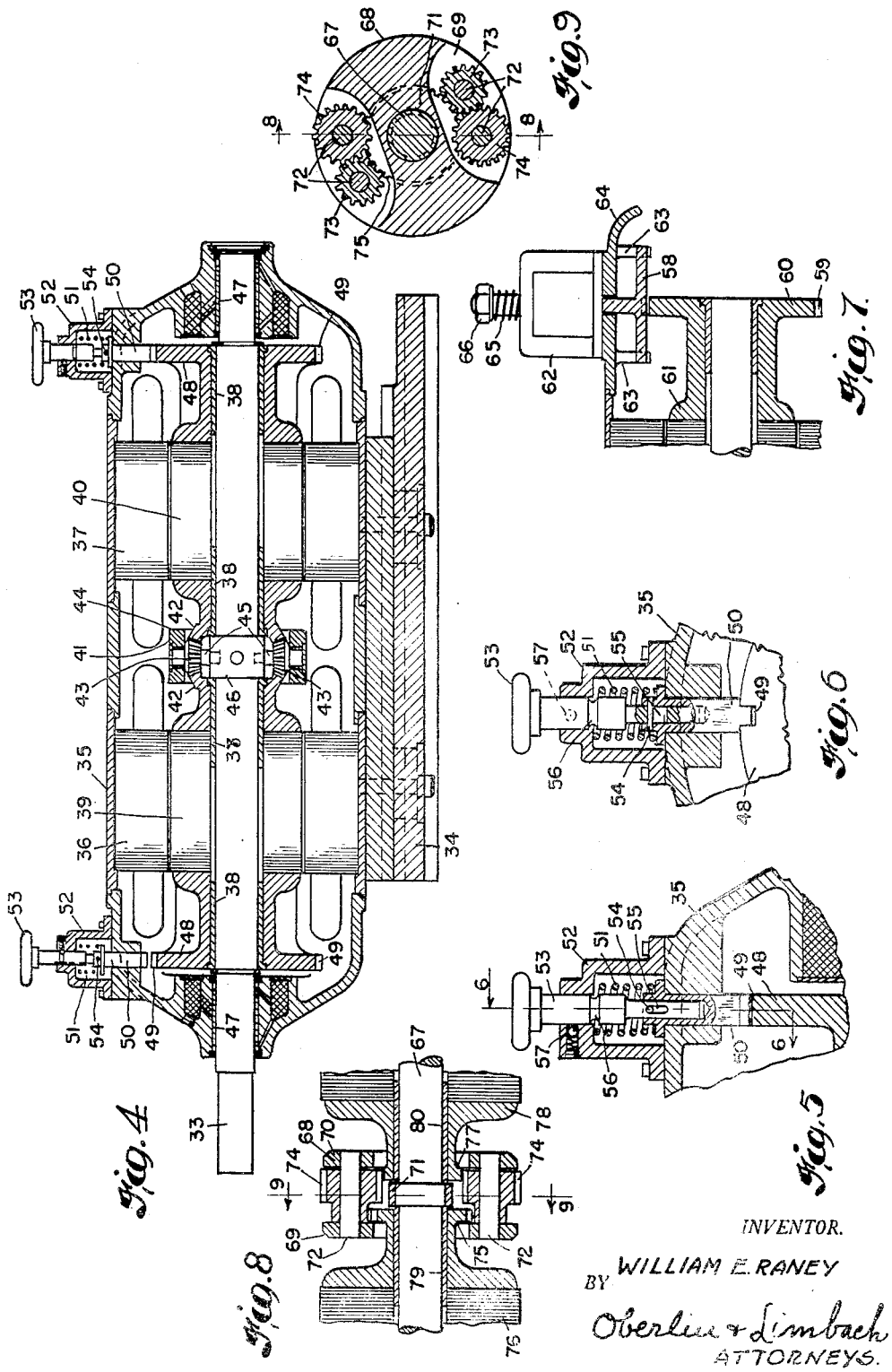

Patented Dec. 18, 1951

2,578,837

UNITED STATES PATENT OFFICE 2,578,837

VARIABLE-SPEED DRIVE

William E. Raney, Lakewood, Ohio

Application April 19, 1949, Serial No. 88,455

4 Claims. (Cl. 172—36)

The present invention relates generally as indicated to a variable speed drive and more particularly to a simple form of electric drive unit in which the drive shaft thereof may be driven at many more different speeds than the electric motors or prime movers thereof. Still more particularly, the present invention has to do with a variable speed drive which comprises a plurality of coaxially disposed electric motors having a common drive shaft between them, the shaft and the rotors of the motors being interconnected by means of differential gearing.

Inasmuch as a large portion of the electric energy produced in this country is generated as alternating current and used in this form, A. C. motors are more commonly used than D. C. motors for general power purposes, such A. C. motors usually being of the simple polyphase induction motor type requiring no commutators and in many instances not having sliprings or other sliding contacts, such simplicity of A. C. motors rendering the same capable of withstanding more severe operating conditions than D. C. motors. However, such A. C. motors are inherently constant speed motors and one objection thereto, as apparent from the following equation, is that the speed thereof can only be varied by changing the slip $s$ for a given load, changing the number of poles $p$, or changing the stator frequency $f$:

$$\text{Motor speed (R. P. M.)} = \frac{120f}{p}(1-s)$$

To change the speed by changing the slip $s$ by introducing resistance into the rotor circuit gives poor speed regulation and wastes a large amount of energy in a rheostat and therefore the motor operates inefficiently at reduced speed. Of course, where the slip $s$ is changed it is possible to introduce counter E. M. F.'s into the rotor circuit at the slip frequency but this requires special commutator machines. The power which, in a resistance control, is dissipated as heat is converted into mechanical power and a portion thereof returned to the line. However, this method of control is only practicable in very large units and therefore its applications are rather limited. Likewise, to change the speed by changing the frequency $f$ of the supply is not feasible because a power supply of only a single fixed frequency is generally available.

The remaining alternative for varying the speed of induction motors, that is changing the number of poles $p$ by changing the connections of the separate parts of the stator windings as by means of multi-polar switches has its limitations as to the number of different speeds attainable owing to the complication of the stator windings.

Hitherto, where more different speeds are required than can be practicably attained by changing the number of poles $p$ it has been necessary to resort to various forms of variable speed motor pulleys and the like involving relatively complex and bulky mechanism in which the variable speed drive shaft is disposed eccentrically of a constant speed drive shaft of the electric motor or other prime mover thereby losing the numerous advantages of a direct electric drive shaft as set forth in my prior Patent No. 2,355,588, dated August 8, 1944, and as disclosed in my co-pending application Serial No. 88,456, filed April 19, 1949.

It is one primary object of this invention to provide a variable speed drive in which the drive shaft constitutes the central drive shaft of a power unit and can be driven at many more different speeds than can the individual components of the power unit.

Another object is to provide a unit of the character indicated in which the variable speed drive shaft thereof is located centrally of the unit and the unit as a whole is no larger in diameter than a conventional electric motor having equivalent power characteristics.

Another object is to provide a drive unit in which a reciprocable drive shaft is axially fixedly connected to a plurality of coaxial electric motor rotors whereby the magnetic field generated in the unit tending to draw the rotors to a neutral axial position is operative to aid or oppose the reciprocatory movements of said drive shaft.

Another object is to provide a drive unit in which a plurality of multi-speed electric motors are so interconnected with a central drive shaft, common to the motors, that the number of speeds at which the drive shaft can be driven is many times more than the number of speeds of the individual motors.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a central longitudinal cross-section view through one embodiment of this invention in which the central drive shaft can be driven at many different rotary speeds and reciprocated while thus driven;

Fig. 2 is a cross-section view taken substantially along the line 2—2, Fig. 1;

Fig. 3 is a cross-section view taken substantially along the line 3—3, Fig. 1;

Fig. 4 is a central longitudinal cross-section view of another embodiment of this invention in which the central drive shaft thereof is axially fixed in the power unit housing as in any conventional electric motor;

Fig. 5 is a fragmentary cross-section view on an enlarged scale of one of the devices for locking and unlocking one of the rotors in the unit, one such device being preferably associated with each rotor;

Fig. 6 is a cross-section view taken substantially along the line 6—6, Fig. 5;

Fig. 7 is a cross-section view of a solenoid-operated rotor locking device which may be employed in either of the embodiments of the invention illustrated in Figs. 1 and 4;

Fig. 8 is a fragmentary cross-section view of a modification taken substantially along the line 8—8, Fig. 9; and Fig. 9 is a cross-section view taken substantially along the line 9—9, Fig. 8.

Referring now to the drawings and first to Fig. 1 therein, the embodiment of the invention therein illustrated comprises a base 1 to which is secured a cylindriform motor housing 2 provided with bearings 3 and 4 at its opposite ends for rotatably supporting a drive shaft 5, said drive shaft extending through said housing and having its opposite ends projecting axially beyond the ends of said housing. Mounted within said housing are a pair of coaxially adjacent stators 6 and 7 each having multi-polar windings for inducing rotation of the respective rotors 8 and 9 within said stators at several different speeds.

Said rotors 8 and 9 are each rotatably supported on the drive shaft 5 as by means of bearings 10 on said shaft and are each fixed on said shaft in desired axially spaced relation as by snap rings 11 which retain the outer bearings 10 against axial movement away from each other, said outer bearings each being formed with a flange engaging the respective rotor end as shown. In the present case, it is preferred that the rotors 8 and 9 be spaced apart so that in one axial position of the shaft 5 and rotors thereon, the latter will be at the neutral axial position to which the magnetic fields generated in the respective stator windings tend to draw said rotors.

In order to drive the drive shaft 5 through rotors 8 and 9 and at a desired speed, there is provided a differential gear mechanism 12 which as shown in Figs. 1, 2, and 4 comprises opposed coaxial bevel gears 14 on the respective rotors 8 and 9 and bevel pinions 15 meshing with said bevel gears, said bevel pinions being carried on a spider or crank 16 for rotation about axes disposed radially of said drive shaft. Said crank 16 is non-rotatably mounted on said drive shaft as by welding, keying, or the like or as shown by the stub shafts 17 of said pinions which extend into radially disposed recesses formed in an enlarged square portion 18 of said drive shaft. The opposite ends of such portion 18 are engaged by the innermost bearings 10 there-adjacent whereby to preclude axial movement of rotors 8 and 9 toward one another and thus preclude binding between the bevel gears 14 and the bevel pinions 15.

As now apparent to those skilled in the art, the energization of the stators 6 and 7 to induce rotation of the rotors 8 and 9 therein will cause a driving of the drive shaft 5 through the particular differential gearing 12 illustrated at a speed equal to one-half the algebraic sum of the speeds of the rotors. To obtain further speeds of the drive shaft it is proposed herein to provide devices for selectively locking either of said rotors 8 and 9 against rotation, in which case the drive shaft 5 may be driven at one-half the speed of the unlocked rotor.

One such locking device comprises providing a member 19 on each rotor in the nature of a flange formed with a plurality of peripheral notches 20 therein and a key 21 moveable radially into and out of engagement with one of the notches in said member 19, said key being slidable in a body 22 bolted onto housing 2 and being actuated by a pivoted cam lever 23 which is so formed that when turned in a clockwise direction, as viewed in Fig. 1, said key 21 will be forced radially inward into engagement with one of the notches in the member 19 and will be locked in such position until the lever 23 is returned to the solid-line position. Springs 24 compressed between said key 21 and body 22 are operative to move the key 21 radially out of engagement with the member 19 upon movement of the cam lever 23 to the position shown. In the present case, the keys 21 at opposite ends of housing 2 are of sufficient length to permit axial reciprocation of the drive shaft 5 and the rotors 8 and 9 on said shaft between the dotted line positions illustrated at the left-hand side of Fig. 1.

By way of simple example, let it be assumed that the stators 6 and 7 are arranged to selectively rotate the rotors 8 and 9 in opposite directions at speeds of 900, 720, and 600 R. P. M. With this combination it is possible to drive the drive shaft 5 in opposite directions at speeds indicated in the following table in response to rotation of the rotors at the speeds indicated:

| Drive Shaft Speeds (R. P. M.) | Rotor Speeds (R. P. M.) |
| --- | --- |
| 60 | 600 and 720 in opposite directions. |
| 90 | 720 and 900 in opposite directions. |
| 150 | 600 and 900 in opposite directions. |
| 300 | 600 and 0. |
| 360 | 720 and 0. |
| 450 | 900 and 0. |
| 600 | 600 and 600 in the same direction. |
| 660 | 600 and 720 in the same direction. |
| 720 | 720 and 720 in the same direction. |
| 750 | 600 and 900 in the same direction. |
| 810 | 720 and 900 in the same direction. |
| 900 | 900 and 900 in the same direction. |

Obviously, speeds other than those indicated in the above table can be obtained by arranging the stators so that the several speeds of one rotor are different from the several speeds of the other rotor, viz. one rotor may be caused to rotate at 600, 720, 900 and 1,200 R. P. M. while the other rotor may be caused to rotate at 600, 900, 1,200, and 1,800 R. P. M. In any event, with the differential gearing 12 shown the speed of drive shaft 5 will always be equal to one-half of the algebraic sum of the individual rotor speeds.

Inasmuch as the particular manner of winding the stator forms no part of the instant invention the same need not be herein illustrated and described, and likewise inasmuch as the multi-polar switch mechanisms for controlling the stators are well known in the art, illustration and description thereof need not be set forth herein.

As illustrated in Fig. 1, the base 1 of the unit is provided with an upstanding extension housing 25 at its rear end into which the rear end of the drive shaft 5 extends and is therein rotatably connected as by a swivel coupling 26 to the piston rod 27 of a piston 28, said piston being reciprocated in a cylinder 29 mounted on said housing 25 as by air pressure selectively admitted into opposite ends of the cylinder through the ports 30 and 31.

An air control valve unit (not shown herein) which is operated responsive to axial movement of the drive shaft 5 for selectively admitting air under pressure into the ports 30 and 31 and a one-way hydraulic restrictor unit (also not shown herein) which is operated as by the swinging of the yoke 32 which is pivotally mounted on housing 25 and engaged by the swivel coupling 26 are both disclosed in my aforesaid co-pending application. For the purposes of the present application it is apparent that when air under pressure is directed through port 30 into the rod end of cylinder 29, the drive shaft 5 together with the rotors 8 and 9 and differential gearing 12 thereon will be shifted toward the right as viewed in Fig. 1 and will be held there against the pull of the magnetic field generated in the stators 6 and 7 tending to draw the rotors 8 and 9 toward the left to a neutral axial position. As previously indicated, either or both of said stators 6 and 7 may be energized to rotate the drive shaft 5 at a selected speed.

In the case where a cutting tool is mounted on said drive shaft, the aforesaid position will be the retracted position and in order to commence the in-feed or left-hand movement of the drive shaft, air pressure in the rod end of cylinder 29 will be exhausted and air under pressure will be directed into the head end of said cylinder through the port 31. Thus, with the assistance of either of the magnetic fields of the stators 6 or 7, or both of them, the in-feed movement of said drive shaft 5 will be commenced. As the rotors 8 and 9 pass beyond the neutral axial position relative to their respective stators, the magnetic field or fields will oppose continued movement and likewise the afore-mentioned one-way hydraulic restrictor unit will effectuate a desired axial speed control of the latter portion of the in-feed movement of said drive shaft to thus preclude abrupt breaking through of the cutting tool as when drilling a workpiece. When the drive shaft reaches a preselected axial position air to the cylinder 29 is suddenly reversed whereupon the combined action of the magnetic field generated in the unit, of the spring employed in the one-way restrictor unit, and of the air acting on the rod end of cylinder 29 will effect a prompt and sure commencement of the out-feed movement. The latter stage of the out-feed movement will be cushioned by the opposition of the magnetic fields, the yoke 32 having by this time disengaged from the restrictor unit. Also, as more fully disclosed in the aforesaid pending application, the air control valve will have associated therewith needle or throttling valves which control the flow of air to said cylinder 29 and will preferably include a quick release latch mechanism which permits actuation of an air operated valve element in said valve.

The embodiment of the invention illustrated in Figs. 4, 5, and 6 is substantially the same as that illustrated in Fig. 1 except that the drive shaft 33 in the former is not reciprocably mounted and that certain modifications have been made in the rotor locking mechanism. As shown, the unit of Fig. 4 comprises a base 34 on which is bolted a motor housing 35 having coaxial, adjacent stators 36 and 37 fixed therein. Rotatable within said stators and on said drive shaft 33 on bearings 38 are the rotors 39 and 40 respectively. Between the rotors 39 and 40 is the differential gearing mechanism 41 which again is exemplarily illustrated as comprising opposed coaxial bevel gears 42 on each rotor and bevel pinions 43 engaged between said bevel gears, said bevel pinions being carried by a spider or crank 44 for rotation about axes disposed radially of drive shaft 33. Said crank 44 is non-rotatably mounted on said drive shaft 33 by any suitable means as for example the stub shafts 45 of said bevel pinions extending into recesses formed in the square enlarged portion 46 formed on said drive shaft. The bearings 38 are arranged similar to the bearings 10 in Fig. 1 so as to axially fix the rotors 39 and 40 on the drive shaft 33. The drive shaft 33 is journalled in the opposite ends of housing 35 by the usual bearings 47.

As in the form of the invention illustrated in Fig. 1 the rotors 39 and 40 in Fig. 4 are each provided with a flange portion 48 having a plurality of notches 47 peripherally thereabout adapted to be engaged by a key member 50. As best shown in Figs. 5 and 6, said key 50 is yieldably urged into engagement with one of the notches of the flange portion 48 as by a spring 51 compressed between said key and a body member 52 secured on housing 35. Actuation of said key is effected through a reciprocable stem member 53 having a lost motion connection therewith, such connection being herein illustrated as comprising a pin 54 through the key and an axially disposed slot 55 in said stem. Said stem is further formed with a peripheral groove 56 in which the spring pressed ball detent 57 engages upon lifting of the stem to a position with the key out of engagement with the respective flange portion 48 as shown in the left-hand end of Fig. 4. The lost motion connection permits the stem to be moved downward to a position with the key pressing against the flange portion of the rotor and ready to pop into one of the notches of the flange portion as soon as the rotor to be locked is slightly rotated through the other rotor and the differential gearing 41.

As apparent, the locking mechanism just described may be incorporated in the Fig. 1 embodiment of the invention simply by making the key 50 of sufficient length in a direction axially of the drive shaft so as to permit the required axial reciprocation of the rotors and drive shaft while retaining the selected rotor locked against rotation.

The mode of operation of the structure just described is essentially the same as that of Fig. 1 except for the omission of the reciprocating feature of the drive shaft and rotors.

In Fig. 7 there is shown a solenoid-operated rotor locking mechanism which is usable in either of the embodiments of the invention illustrated in Figs. 1 and 4. Said locking mechanism comprises a key 58 movable radially into and out of engagement with one of the notches 59 formed in the flange portion 60 of the rotor 61. Said key 58 constitutes the core or armature of a solenoid 62 and has its ends radially slidably fitting between two pairs of lugs 63 which straddle the opposite ends of said key, said lugs being formed in the motor housing 64. Said key 58 and solenoid 62 are so arranged that upon energization of the solenoid, said key will be urged radially inward into locking engagement with the flange portion 60 of the respective rotor 61. Upon deenergization of said solenoid, a spring 65 compressed between the solenoid and a headed portion 66 of the key moves the latter radially out of such engagement with the flange portion 60.

It will be apparent that in lieu of the bevel differential gearing mechanisms described above, other well known forms thereof may be employed, such as that illustrated in Figs. 8 and 9 wherein the drive shaft 67 may be axially fixedly mounted or reciprocable as desired and has non-rotatably mounted thereon a crank or spider 68 which is formed with axially spaced ring-like portions 69 and 70 joined together by the central web 71, said web being keyed, welded, shrink-fitted or otherwise non-rotatably secured on shaft 67. Journalled between the portions 69 and 70 on said crank 68 as by shafts 72 are two pairs of intermeshing gears 73 and 74, said gears 73 meshing with a gear 75 on the rotor 76 and said gears 74 meshing with a gear 77 on the rotor 78. As in the previously described constructions, the rotors 76 and 78 are rotatable on the bearings 79 and 80 around the drive shaft 67.

When the gears 75 and 77 are of equal pitch diameter and when the pinion gears 73 and 74 on the crank 68 are likewise of equal pitch diameter the differential or planetary gearing illustrated in Figs. 8 and 9 will effect a driving of the drive shaft 67 at a speed equal to one-half the algebraic sum of the speeds of rotation of the rotors 76 and 78. However, with this form of differential gearing it is possible to obtain other relationships in the speeds simply by making the gears 75 and 77 and the gears 73 and 74 of different pitch diameters as shown.

Having thus described typical embodiments of this invention it is now understandable that a simple and light-weight form of variable speed drive has been devised. Moreover, such drive simply comprises coaxially disposed electric motors having a common drive shaft centrally therein which is capable of being driven at any of a plurality of selected speeds by means of differential gearing disposed between the rotors of said motors and said shaft, such differential gearing enabling the combining of the several speeds of each individual motor in a number of ways to result in a driving of the drive shaft at any of a much greater number of different speeds. Also, all of the advantages of a direct drive unit are retained and additional advantages are attained by reason of the wide spacing of the bearings at opposite ends of the drive shaft. It is to be understood that, although but two forms of differential gearing have been disclosed herein, other known forms thereof may be substituted.

Other modes of applying the principle of the invention may be employed, change being made as regards the details described, provided the features stated in any of the following claims, or the equivalent of such, be employed.

I therefore particularly point out and distinctly claim as my invention:

1. A variable speed drive comprising a tubular housing, two electric motor stators mounted coaxially within said housing with adjacent ends of the windings thereof substantially in abutting relation, a drive shaft extending axially into said housing and axially through said stators, means on said housing supporting the opposite ends of said drive shaft for rotation about the axis thereof and for axial reciprocation, two electric motor rotors rotatably mounted on said shaft for rotation within the respective stators, differential gearing disposed between the adjacent ends of said rotors and inside of the substantially abutting ends of the stator windings, said gearing being operatively connected with said rotors and said shaft for driving the latter responsive to rotation of said rotors, and said rotors, shaft and gearing being connected together for reciprocation axially as a unit in said housing and said stators whereby a cutting tool adapted to be secured on said shaft may be simultaneously rotated and reciprocated with respect to the workpiece, and an actuating device operatively connected to said shaft for reciprocating the latter while driven through said differential gearing.

2. A variable speed drive comprising a tubular housing, two electric motor stators mounted coaxially within said housing with the adjacent ends of the windings thereof substantially in abutting relation, a drive shaft extending axially into said housing and axially through said stators and having its opposite ends journalled in opposite ends of said housing, two electric motor rotors rotatably mounted on said shaft for rotation within the respective stators, differential gearing disposed between the adjacent ends of said rotors and inside of the substantially abutting ends of the stator windings, said gearing being operatively connected with said rotors and said shaft for driving the latter responsive to rotation of said rotors, and a rotor locking member carried by said housing for movement into and out of locking engagement with one of said rotors, said locking member being disposed adjacent the remote end of the respective stator winding.

3. The apparatus according to claim 2 further characterized in that said one rotor is formed with a peripheral notch and that said locking member is mounted for sliding radially into and out of interfitting relation with such notch.

4. The apparatus according to claim 2 further characterized in that there is a second locking member carried by said housing for movement into and out of locking engagement with the other of said rotors, said second locking member being disposed adjacent the remote end of the respective stator winding.

WILLIAM E. RANEY.

REFERENCES CITED

The following references are of record in the file of this patent:

UNITED STATES PATENTS

| Number | Name | Date |
|---|---|---|
| 436,127 | Edison | Sept. 9, 1890 |
| 808,220 | Simonds | Dec. 26, 1905 |
| 1,700,078 | Rydberg | Jan. 22, 1929 |
| 2,311,168 | Gendriess | Feb. 16, 1943 |
| 2,491,842 | Wells | Dec. 20, 1949 |